United States Patent [19]
Yamamoto et al.

[11] Patent Number: 5,506,705
[45] Date of Patent: Apr. 9, 1996

[54] GOGGLE TYPE DISPLAY APPARATUS

[75] Inventors: Yoshitaka Yamamoto, Yamatokoriyama; Yutaka Ishii, Nara; Fumiaki Funada, Yamatokoriyama, all of Japan

[73] Assignee: Sharp Kabushiki Kaisha, Osaka, Japan

[21] Appl. No.: 299,355

[22] Filed: Sep. 1, 1994

[30]     Foreign Application Priority Data

Sep. 1, 1993 [JP] Japan .................................. 5-217700

[51] Int. Cl.⁶ ...................... G02F 1/1335; G02F 1/1333; G02F 1/136; C09K 19/52
[52] U.S. Cl. .................. 359/40; 359/59; 359/83; 359/68; 359/98
[58] Field of Search .................... 359/59, 40, 83, 359/98, 68, 630; 345/7, 8

[56]     References Cited

U.S. PATENT DOCUMENTS

| | | | |
|---|---|---|---|
| 3,915,548 | 10/1975 | Opittek et al. | 359/54 |
| 4,632,514 | 12/1986 | Ogawa et al. | 358/339 F |
| 4,850,685 | 7/1989 | Kamakura et al. | 359/59 |
| 5,019,808 | 5/1991 | Prince et al. | 350/330 |
| 5,032,007 | 7/1991 | Silverstein et al. | 359/68 |
| 5,168,382 | 12/1992 | Tsujikawa | 359/59 |
| 5,170,153 | 12/1992 | Migozzi et al. | 359/630 |
| 5,359,441 | 10/1994 | Mori et al. | 359/51 |

FOREIGN PATENT DOCUMENTS 4310925  11/1992  Japan .

OTHER PUBLICATIONS

"Trend of Virtual Reality Technology" published Sep. 1992 by M. Hirose of Dept. of Mechano–Informatics, Faculty of Engineering, University of Tokyo, pp. 597–604.

"A Stereoscopic Display Using LCDs" by Messrs. Uchida and Miyashita; Tohoku University, Sendai, Japan; SID 86 Digest, pp. 440–443; 1986.

"Presentation"; Partial translation of Television Society Paper, vol. 46, No. 6, pp. 689–693; published 1992 by J. Nomura of Matsushita Electric Works, Ltd., Osaka.

"Helmet–Mounted Display Electronics for Evaluating Virtual Panoramic Display Systems" by John Sellers; Electronic Image Systems, Inc., Xenia, OH; SID 91 Digest, pp. 491–494; 1991.

*Primary Examiner*—Anita Pellman Gross
*Assistant Examiner*—Fetsum Abraham

[57]     ABSTRACT

The goggle type display apparatus of this invention comprises a first image generating unit for providing an image for the left eye and a second image generating unit for providing an image for the right eye, each of the first image generating unit and the second image generating unit comprising: a polarization beam splitter for polarizing light emitted from a light source; and a reflection type display device including a substrate, a switching circuit formed on the substrate, a display medium for modulating the light polarized by the polarization beam splitter to provide the light with image information, and an electrode layer electrically connected to the switching circuit for applying a voltage to the display medium, the electrode layer reflecting the light incident thereto after passing through the display medium.

18 Claims, 16 Drawing Sheets

GOGGLE TYPE DISPLAY APPARATUS

BACKGROUND OF THE INVENTION

1. Field of the Invention

The present invention relates to a goggle type display apparatus, and more specifically, to a goggle type display apparatus mounted on the user's head to realize virtual reality.

2. Description of the Related Art

In recent years, increasingly rapid progress has been made in realizing less expensive computers with higher performance. With this progress, many kinds of technology which had been long thought impossible are now being realized. One type of such technology which has especially attracted attention and of which progress has been greatly expected is virtual reality (VR) technology.

The VR technology is an integrated form of many kinds of technology including display technology, computer technology, sensor technology, and acoustic system technology. Among them, the improvement in performance of computers has greatly contributed to the realization of the VR technology. Thus, the computer technology occupies a larger portion of the VR technology, even though many other novel arts of technology are involved in the VR technology.

According to VR technology, by being exposed to images, sounds, and the like produced by electronic means such as a computer, the viewer feels the images which do not exist in reality as if they actually exist. Thus, the viewer can enter the image space created by the computer and enjoy various experiences.

According to VR technology, the senses of the viewer themselves work as interfaces between the computer and the viewer, so that the viewer can experience events in the virtual space created by a computer in a purely natural manner. In this meaning, the VR technology also idealistically works as a man-computer interface.

Thus, VR technology provides an opportunity of experiencing easily and naturally what otherwise could not have been experienced. For this reason, the application of VR technology in the future to the fields of amusement, education, computer interface, and the like is greatly expected. The general outline of VR technology is described, for example, in M. Hirose, "Trend of Virtual Reality Technology", Kogaku, vol. 21, No. 9, pp. 597–604 (1992).

The visual sense is the most important sense for human beings. It is said that approximately 80–90% of information obtained by recognizing the external world is recognized by the visual sense. For this reason, in order to realize high level virtual reality, a high level technique of forming visual information is indispensable. In other words, in order to obtain virtual reality with more naturalness using the VR technology, it is indispensable to use a display system superior in VR display.

As for the display technology for VR, several display systems have been conventionally proposed. Among these systems, a head mounted display (HMD) system in which a goggle type display apparatus or the like is mounted on the head of the viewer has attracted wide attention as a significantly promising system. The following display methods are known for the goggle type display apparatus used for the HMD system.

1) CRT mirror reflection method

Because the display apparatus adopting this method provides images with high precision, this display method has been studied as an epoch-making technique in which the pilot in the cockpit can handle a large amount of information in an integral manner. This method is described in detail in J. Sellers, "Helmet-Mounted Display Electronics for Evaluating Virtual Panoramic Display Systems", SID 91 Digest, pp. 491–494 (1991). FIG. 15 shows the concept of a virtual panoramic display (VPD) system, a typical application of this method.

The VPD system has been proposed as a system for providing various kinds of information to the pilot in the cockpit. A helmet 101 which is a display apparatus of the VPD system includes two CRTs 102, optical systems, and an HPS or a sensor for detecting the position and orientation of the user's head. A unit for controlling the display, and the like are disposed in a cockpit 100. The VPD system also includes a cooling unit for the helmet 101, an image generating computer, a control computer, and the like. With these components, the size of the VPD system is very large. Since the CRTs 102 are mounted in the helmet 101, the entire VPD system inevitably becomes large and heavy. The cooling unit for cooling heat generated from the CRTs 102 is additionally required. For these reasons, the application of the VPD system has been limited only to a specific industrial field and to the military field.

2) Transmission type LCD method

Since the transmission type LCD is thin and light, a small and light HMD system can be realized by adopting this method. A display apparatus adopting this method is commercially available from Visual Programming Language (VPL) Corp. under the product name of "Eyephone". This display method is described in detail in J. Nomura, Television Society Paper, vol. 46, No. 6, pp. 689–693 (1992) and T. Uchida and T. Miyashita, "A stereoscopic Display Using LCDs", SID 86 Digest, pp. 440–443 (1986). FIG. 16 shows the principle of this display method. Though FIG. 16 only shows one set of a major portion of an apparatus for one eye, the actual apparatus should include two sets for both the left and right eyes.

An LCD 120 for the left or right eye is illuminated by an illumination optical system 122 composed of a light guiding plate 122a and a fluorescent lamp 122b. Information visualized by the LCD 120 is then received by the viewer through an eyepiece optical system 121. The respective images reflected on the left and right eyes have been generated by a computer as images to be viewed with the both eyes simultaneously. By this simultaneous viewing, the parallax between the left and right eyes is utilized to realize a stereoscopic display. The image is generated by the computer according to the information including the position and orientation of the viewer's head and the position of a viewer's hand detected by a magnetic sensor, an optical fiber sensor, and the like.

This display method has the following problems. Since this method uses a transmission type LCD where an increase in the number of pixels is limited, images with high precision can not be obtained, and thus the reality of the images is not satisfactory. Actually, the number of pixels of Eyephone is only 360×240 pieces. With such a small number of pixels, when a large number of letters are simultaneously displayed on one screen, each letter cannot be displayed clearly. Further, since the LCD used in this display method is of a direct-view type, there arise problems relating to the characteristics of the visual sense, such as the dependency of the display on the angle of visibility and the uniformity of display. For example, in order for the viewer to satisfactorily enjoy the visual realism according to the characteristics of the visual sense, it is required to maintain the display under good conditions over the range defined by the angles of visibility of 50° toward left and right, 35° toward upward, and 50° toward downward. However, such a broad range of the angles of visibility cannot be realized by the direct-view type LCD.

3) LED (light emitting diode) scanning method

FIG. 17 shows the principle of display for a display apparatus adopting the LED scanning method. In this display apparatus, a light pattern is emitted from a one-dimensional LED array 130. This pattern is oscillated by an oscillation mirror 131, so that a two-dimensional pattern is obtained by the afterimage effect of the eyes. More specifically, a one-dimensional pattern (in a y direction) formed by the on/off of LEDs of the LED array 130 is magnified by a magnifying mirror 132 and scanned in an x direction by the oscillation mirror 131, thereby converting the one-dimensional pattern into a two-dimensional image.

Though the display apparatus adopting this method is small and light, it has problems as follows. Since only a binary display is allowed, an intermediate tone is not available. Further, since the precision of the display apparatus depends upon the density of the LED array 130, or the number of LEDs in the array, high precision display is not possible. A display apparatus adopting this method is commercially available under the product name of "Private Eye".

Hereinbefore, the typical goggle type display apparatuses used for the HMD system have been described. These conventional apparatuses have the following problems.

In order to obtain the visual realism by the HMD system, the following four requirements should be satisfied: 1) a broad field of vision, 2) natural stereoscopic display, 3) high precision display, and 4) a small and light apparatus.

The CRT mirror reflection method satisfies requirements 1) through 3), but does not satisfy requirement 4) because it is difficult to make the CRT itself thin and light.

The transmission type LCD method can be made small and light. However, a broad range of the angles of visibility is not obtained. Moreover, the improvement in precision of the display is limited. This is because, as the size of pixels of the transparent type LCD is reduced, the aperture of the LCD lowers, and thus the luminance of the display is lowered. Accordingly, the size of the pixels cannot be reduced beyond a predetermined level.

The trouble of the limited improvement in precision of the display for the transmission type LCD will be described in more detail, taking an LCD using conventional TFTs as an example, as follows.

Conventionally, polysilicon (p-Si) and amorphous silicon (a-Si) are used for TFTs. An LCD using such TFTs has the following problems.

The mobility of charges of an a-Si TFT is generally 0.1–0.5 $cm^2.V^{-1}.s^{-1}$. This means that the ON resistance of the transistor is high, and, as a result, the size of the TFT should be large. The mobility of a p-Si TFT is higher than that for the a-Si TFT, but it is still as low as approximately 50–100 $cm^2.V^{-1}.s^{-1}$. Therefore, the size of the p-Si TFT should also be large. The p-Si TFT has another problem of having a small OFF resistance. This is another factor for requiring large size TFTs.

For the a-Si TFT and p-Si TFT, when the polarity of the voltage applied through the source and drain thereof is alternately inverted, the electrical properties of the TFT differ between the different polarities. This produces a non-uniform display on the LCD screen, causing flickering and twinkling on the screen. In order to solve this problem, a driving method in which the polarity of the applied voltage is switched every scanning line (1H line inversion driving) is generally adopted. According to this method, however, since the polarity of the voltage applied to the pixels is different for every scanning line, a large electric field may be formed between adjacent pixels, resulting in disordering the orientation of the liquid crystal. Actually, when ±5 V is applied as the driving voltage, the distance between the pixels should be 10 microns or more. With this distance, the displayed image is prevented from being influenced by the electric field generated between adjacent pixels.

As described above, in the conventional LCDs using TFTs, the size of the TFTs cannot be reduced so much. Therefore, when the size of each pixel is made smaller so as to obtain high precision display, the TFT occupies a larger area of the pixel and thus the aperture of the LSD lowers. When the pitch of the pixels is 20 microns or less, the aperture is substantially zero. For this reason, high precision display is not possible for the goggle type display apparatus adopting the transmission type LCD method, and thus display of natural images cannot be obtained.

In addition, in a conventional color LCD, color filters are disposed on the LCD, and one color among red (R), green (G), and blue (B) colors is allocated to each pixel. Since a color of one point is produced by synthesizing three pixels of R, G, and B colors, the displayed image is coarser.

The LED scanning method can realize a broad range of the angles of visibility, and can be small and light. However, since only binary display is allowed, an intermediate shade of color is not available, and thus the display of natural images is not possible. Moreover, since the precision of the display depends upon the density of the LED array and the increase in the density is limited, high precision of the display is not possible. For this reason, also, the display of natural images cannot be obtained.

SUMMARY OF THE INVENTION

The goggle type display apparatus of this invention comprises first image formation means for providing an image for the left eye and second image formation means for providing an image for the right eye, each of the first image formation means and the second image formation means comprising: light polarization means for polarizing light emitted from a light source; and reflection type display means including a substrate, switching means formed on the substrate, a display medium for modulating the light polarized by the light polarization means to provide the light with image information, and an electrode layer electrically connected to the switching means for applying a voltage to the display medium, the electrode layer reflecting the light incident thereto after passing through the display medium.

In one embodiment, the display medium of the reflection type display means is liquid crystal.

In another embodiment, the substrate of the reflection type display means is made of single crystal silicon.

In another embodiment, each of the first image formation means and the second image formation means further comprises a screen on which the light carrying the image information supplied from the reflection type display means is projected.

In another embodiment, each of the first image formation means and the second image formation means further comprises light converging means for converging the light projected onto the screen.

In another embodiment, each of the first image formation means and the second image formation means further comprises projection means for magnifying and projecting the light reflected from the electrode layer of the reflection type display means.

In another embodiment, each of the first image formation means and the second image formation means further comprises light collimating means for collimating the light emitted from the light source.

In another embodiment, each of the first image formation means and the second image formation means further comprises light selection means selectively converting the light emitted from the light source to red color light, green color light, and blue color light.

In another embodiment, the light selection means includes a liquid crystal layer containing a cyan dichroic pigment, a liquid crystal layer containing a magenta dichroic pigment, and a liquid crystal layer containing a yellow dichroic pigment.

In another embodiment, the light selection means includes a first filter allowing red color light to pass therethrough, a second filter allowing green color light to pass therethrough, a third filter allowing blue color light to pass therethrough, a first optical fiber for guiding the light emitted from the light source to the first, second, and third filters, and a second optical fiber for guiding the light after having passed the first, second, and third filters to the light polarization means.

In another embodiment, the light selection means includes a mechanical RGB rotation filter.

In another embodiment, each of the first image formation means and the second image formation means further comprises reflection means for reflecting the light carrying the image information supplied from the reflection type display means to the screen.

In another embodiment, each of the first image formation means and the second image formation means further comprises an optical fiber for guiding the light carrying the image information supplied from the reflection type display means to the reflection means.

In another embodiment, the light source is a single light source, and one of the light polarization means of the first and the second image formation means separates light emitted from the single light source and sends the separated light to the display means of the first and the second image formation means.

In another embodiment, at least one of the light polarization means of the first and the second image formation means is a polarization beam splitter.

Because at present there is no display which is smaller and lighter than an LCD, the LCD is used for the goggle type display apparatus according to the present invention. The LCD used in the present invention is a reflection type which includes a reflection film, not the conventional type which utilizes light transmitting through the LCD for display. The reflection type LCD permits the reflection film to be formed on transistors of the LCD. Therefore, even when circuits such as TFTs occupy a larger portion of the LCD, the efficiency of light utilization does not decrease. As a result, the size of pixels of the LCD can be reduced.

When a direct-view type LCD is used, the quality of display varies depending on the angle of visibility, regardless whether the LCD is a transmission type or a reflection type. In this case, when the field of vision is broad, favorable display characteristics are not obtained. In order to solve this problem, the goggle type display apparatus of the present invention uses a screen on which images displayed on the LCD and magnified by the projection means are projected, and the user views the projected images on the screen.

In general, however, the display apparatus including the screen requires a large projection optical system, which makes the entire apparatus large. To solve this problem, the projection optical system and the LCD should be as small as possible. However, when an image displayed on a small LCD is magnified and projected onto the screen, the area of each pixel is also magnified, and thus resultant images are less precise and natural. To overcome this problem, the goggle type display apparatus of the present invention uses single crystal silicon for the substrate on which transistors for driving the LCD are formed, so as to reduce the size of the LCD as well as miniaturizing the pixels, and increasing the density of pixels on the LCD.

An LSI using single crystal silicon is superior in the transistor characteristics. Table 1 shows the characteristics of transistors of which substrates are formed of single crystal silicon, polysilicon, and amorphous silicon.

TABLE 1

|  |  | Single crystal silicon | Polysilicon | Amorphous silicon |
| --- | --- | --- | --- | --- |
| Mobility | Electron | 1500 | 100 | 0.1 – 0.5 |
| ($cm^2.V^{-1}.S^{-1}$) | Hole | 600 | 50 | — |
| I on/I off |  | $>10^9$ | $10^7$ | $10^6$ |
| Operating frequency (CMOS shift register) |  | Several GHz (1 μm rule) | 20 MHz (L = 10, W = 30 μm) | 5 MHZ (L = 10, W = 30 μm) |

As is apparent from Table 1, the mobility of electrons of single crystal silicon is approximately 1500 $cm^2.V^{-1}.s^{-1}$ and the current flow in single crystal silicon at the ON time is significantly larger compared with those in polysilicon and amorphous silicon. In addition, the resistance of single crystal silicon at the OFF time is significantly reduced. Accordingly, the ratio of the current value at the ON time to that at the OFF time (I ON/I OFF) when a predetermined voltage is applied between the source and the drain of the TFT is significantly large, allowing the transistor to be switched by the application of a small voltage. This means that transistors can be arranged on the LCD with high density. As a result, when single crystal silicon is used for the substrate of the LCD, pixels of the LCD can be miniaturized and arranged with high density. Further, in such an LCD, the same electrical properties can be obtained even when the polarity of the voltage applied between the source and drain of the transistors is reversed. As a result, the flickers that occur due to the difference in transistor characteristics between the opposite polarities of the voltage are prevented. This eliminates the necessity of conducting the conventional 1H inversion driving, thereby decreasing the electric field between adjacent pixels. As a result, the distance between adjacent pixels can be significantly reduced, and thus the density of the pixels on the LCD can be increased.

When an LCD adopting a field sequential scanning method and light selection means adopting a color sequential switching method are combined, each pixel can sequentially display R, G, and B colors. This allows for high precision color display. As a result, superior realism never experienced before can now be realized.

Thus, the invention described herein makes possible the advantages of (1) providing a small and light goggle type display apparatus which can display natural images with high precision, and (2) providing a goggle type display apparatus which can display color images with high precision.

These and other advantages of the present invention will become apparent to those skilled in the art upon reading and understanding the following detailed description with reference to the accompanying figures.

DESCRIPTION OF THE PREFERRED EMBODIMENTS

(EXAMPLE 1)

Figure 1:
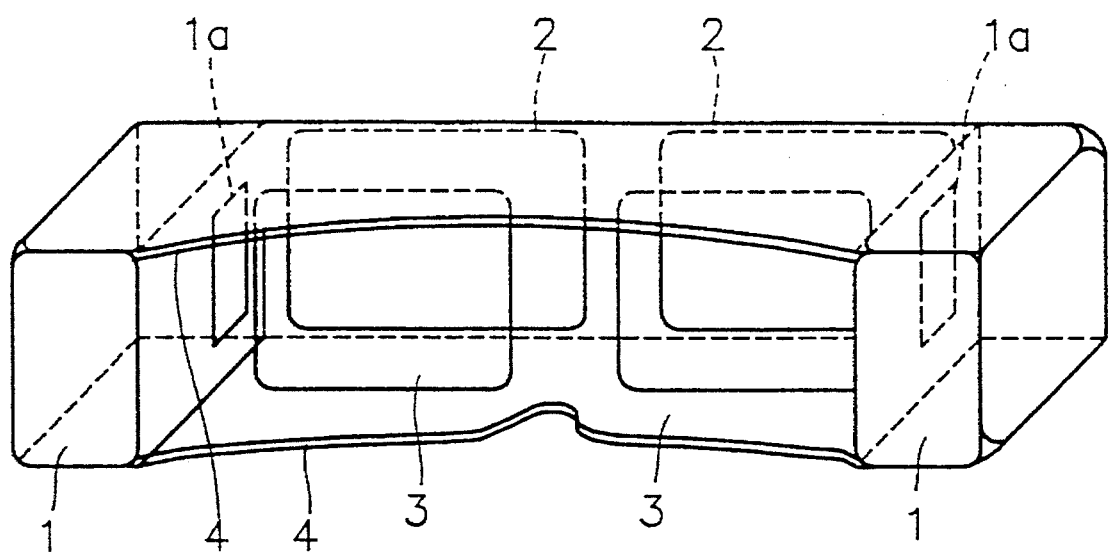
FIG. 1 shows an appearance of a goggle type display apparatus of a first example according to the present invention.

A first example of the present invention will be described with reference to FIG. 1.

The goggle type display apparatus of this example is used for an HMD (head mounted display) system for the realization of VR (virtual reality). The display apparatus constitutes the HMD system together with a driving system, a data processing/control computer, and the like which are not shown, and is worn by the user like goggles.

The goggle type display apparatus of this example includes a pair of boxes 1 on the both sides thereof. A pair of left and right screens 2 and a pair of left and right eyepiece optical systems (light converging means) 3 are disposed between the boxes 1. The screens 2 and the eyepiece optical systems 3 are covered with a pair of top and bottom light shade hoods 4.

Projection windows 1a are formed through the boxes 1. Display units are contained in the respective boxes 1. Information visualized by each display unit is magnified and projected on the screen 2 through the projection window 1a. The screens 2 are located just in front of the left and right eyes of the user. Thus, the user can view images projected on the screens 2 through the eyepiece optical systems 3.

The images projected onto the left and right screens 2 have been processed by the data processing/control computer so that the images when synthesized can be recognized as a stereoscopic image. The screens 2 expand to cover the whole field of vision of the user and are designed so that the user can obtain satisfactory realism.

The pair of eyepiece optical systems 3 play the role of focusing the images displayed in front of the eyes onto the eyes. The pair of light shade hoods 4 prevents light from entering the images from outside and thus deteriorating the display quality of the images. They also prevent light or a view other than the images from entering the field of vision of the user and thus deteriorating the realism.

Figure 2:
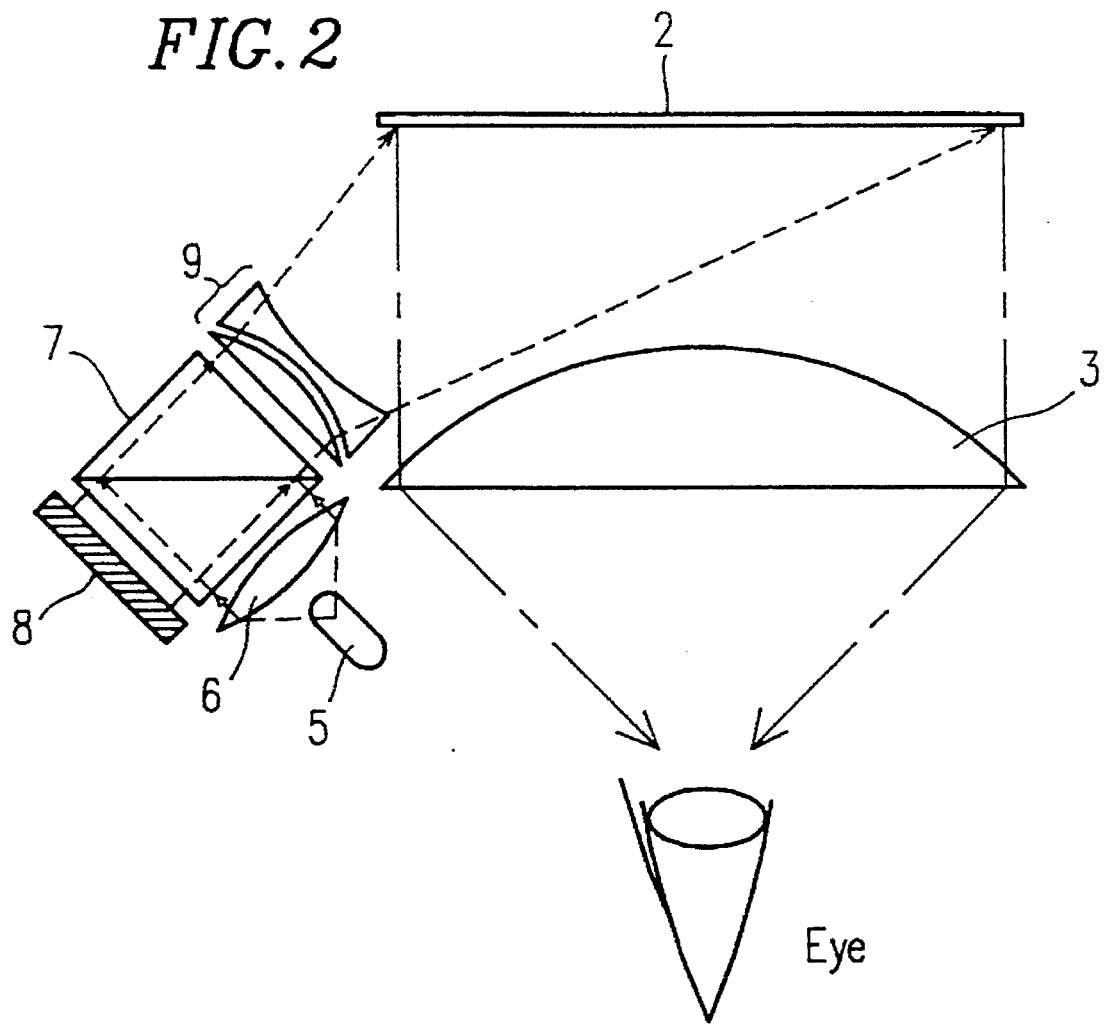
FIG. 2 schematically shows the principle of display for the first example according to one embodiment of the present invention.

Referring to FIG. 2, the principle of the display of images conducted by the display apparatus of this example will be described.

The goggle type display apparatus of the present invention includes a first image generating unit (first image formation device) for providing images for the user's left eye and a second image generating unit (second image formation device) for providing images for the user's right eye. FIG. 2 shows only the first image generating unit which is a left portion of the goggle type display apparatus shown in FIG. 1. Each of the first and second image generating units includes the box 1 with the projection window 1a, the screen 2, and the eyepiece optical system 3 as the light converging means, and is operated under the same principle of display. Accordingly, for simplification, in this example and the subsequent examples, only the first image generating unit, the left portion of the apparatus, will be used for the description of the principle of display.

Each of the first and second image generating units further includes a lamp (a light source) 5 for emitting light, a collimating optical system (light collimating device) 6 for collimating the light, a polarization beam splitter (polarization device) 7 for polarizing the light, an LCD 8 as reflection type display means, and a projection optical system (projection device) 9 for projecting the light. All of these components are set in the box 1.

Light emitted from the lamp 5 is made parallel by the collimating optical system 6. The parallel light is then split into an s polarizing wave and a p polarizing wave by the polarization beam splitter 7. Only the s polarizing wave is turned by approximately 90° so as to be incident to the LCD 8.

The incident light is modulated by the LCD 8 according to image information supplied from a computer (not shown), and the modulated light returns to the polarization beam splitter 7. The returned light which carries information obtained by the polarization and the modulation then passes through, or is refracted from the polarization beam splitter 7. Only light passing through the polarization beam splitter 7 is magnified and projected onto the screen 2 by the projection optical system 9. The light projected on the screen 2 which carries image information is converged by the eyepiece optical system 3. Thus, the user of the display apparatus can view the magnified image projected on the screen 2 through the eyepiece optical system 3.

Figure 3:
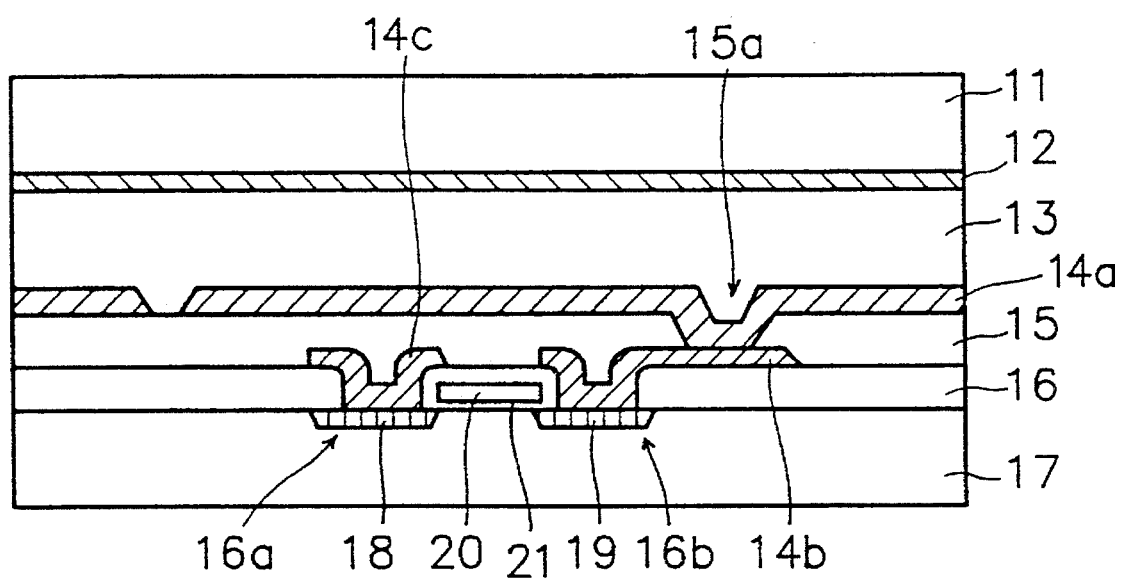
FIG. 3 is a sectional view of a reflection type LCD using single crystal silicon according to one embodiment the present invention.

Now, referring to FIG. 3, the LCD 8 of this example will be described.

The LCD 8 includes a substrate 17 made of single crystal silicon. A switching circuit of a silicon gate NMOS is formed on the substrate 17. The switching circuit includes a source 18 and a drain 19 formed in the upper portion of the single crystal silicon, a source electrode 14c formed on the source 18, and a drain electrode 14b formed on the drain 19. A gate 20 of this NMOS made of polysilicon is formed over the gap between the source 18 and the drain 19, and is covered with a gate insulation film 21.

A field oxide film 16 and a protection film 15 are formed on the substrate 17 in this order. Contact holes 16a and 16b are formed through the field oxide film 16 at portions corresponding to the source 18 and the drain 19. Part of the source electrode 14c and part of the drain electrode 14b are formed in the contact holes 16a and 16b, respectively.

A lower electrode 14a as an electrode layer, a liquid crystal layer 13 as a display medium, a transparent electrode 12, and a transparent glass substrate 11 are formed on the protection film 15 in this order. The transparent electrode 12 and the lower electrode 14a constitute a pair of pixel electrodes for applying a voltage across the liquid crystal layer 13 sandwiched therebetween. The lower electrode 14a also works as a light reflection film. The lower electrode 14a is preferably made of aluminum which has a high reflectance and a high electrical conductivity. The drain electrode 14b of the NMOS is connected to the lower electrode 14a through a contact hole 15a formed through the protection film 15. The protection film 15 is made flat so as to provide the lower electrode 14a with a good flatness.

The light incident to the transparent glass substrate 11 from the polarization beam splitter 7 passes through the transparent electrode 12 and the liquid crystal layer 13. The light is then reflected from the lower electrode 14a and output from the transparent glass substrate 11. During this process, the incident light is modulated at the liquid crystal layer 13 so as to carry image information.

The LCD used for this example is approximately 9 mm in length, 16 mm in width, and 0.7 inches in diagonal length. Such an LCD has approximately 1000×1600 pieces of finely minute pixels each having a size of approximately 9 microns in length and 10 microns in width.

In this example, the silicon gate NMOS was used as the switch circuit for the LCD. However, transistors other than the NMOS structure can also be used as the switching circuit. Also, one or more types of elements which are conventionally used for ICs, such as an MOS structure, a bipolar structure, a diode, a resistor, and a capacitor, may be used as a part of the switching circuit. The material for the gate electrode 20 is not limited to polysilicon. Also, the material for the lower electrode 14a is not limited to aluminum, but any other material may be used as long as they are superior in electrical conductivity and light reflectance.

The display apparatus of this example uses the LCD for the display of images. Therefore, the display apparatus can be made light and small compared with the apparatus using a CRT. Since the LCD is of the reflection type, the lower electrode can be formed on the switching circuits such as TFTs, and the portions on the switching circuits can also be used as the pixel area. Accordingly, it is not required to form switching elements, wirings, and the like at the boundaries between adjacent pixels, allowing a plurality of pixels to be disposed close to one another. As a result, the density of pixels on the LCD can be increased without lowering the efficiency of light utilization, and the pixels can be miniaturized. With these minute pixels arranged on the LCD with high density, even when images are magnified and projected onto the screen so as to achieve a broad field of vision, images with high resolution can be presented.

Further, since single crystal silicon is used for the substrate on which the driving circuits of the LCD is formed, the elements of the driving circuits can be closely disposed to one another. This makes it possible to further reduce the size of the LCD and also to reduce the size of the pixels of the LCD. As a result, it is possible to provide a small-size display apparatus which can provide images with high quality, though the apparatus additionally includes the screen. Thus, according to this example, a small and light display apparatus for VR which provides natural images with high precision and with satisfactory realism can be realized.

A reflection type LCD without the silicon substrate may also be used as far as minute pixels can be formed on such an LCD, and a satisfactory realism can be obtained by images projected on the screen.

(EXAMPLE 2)

Figure 4:
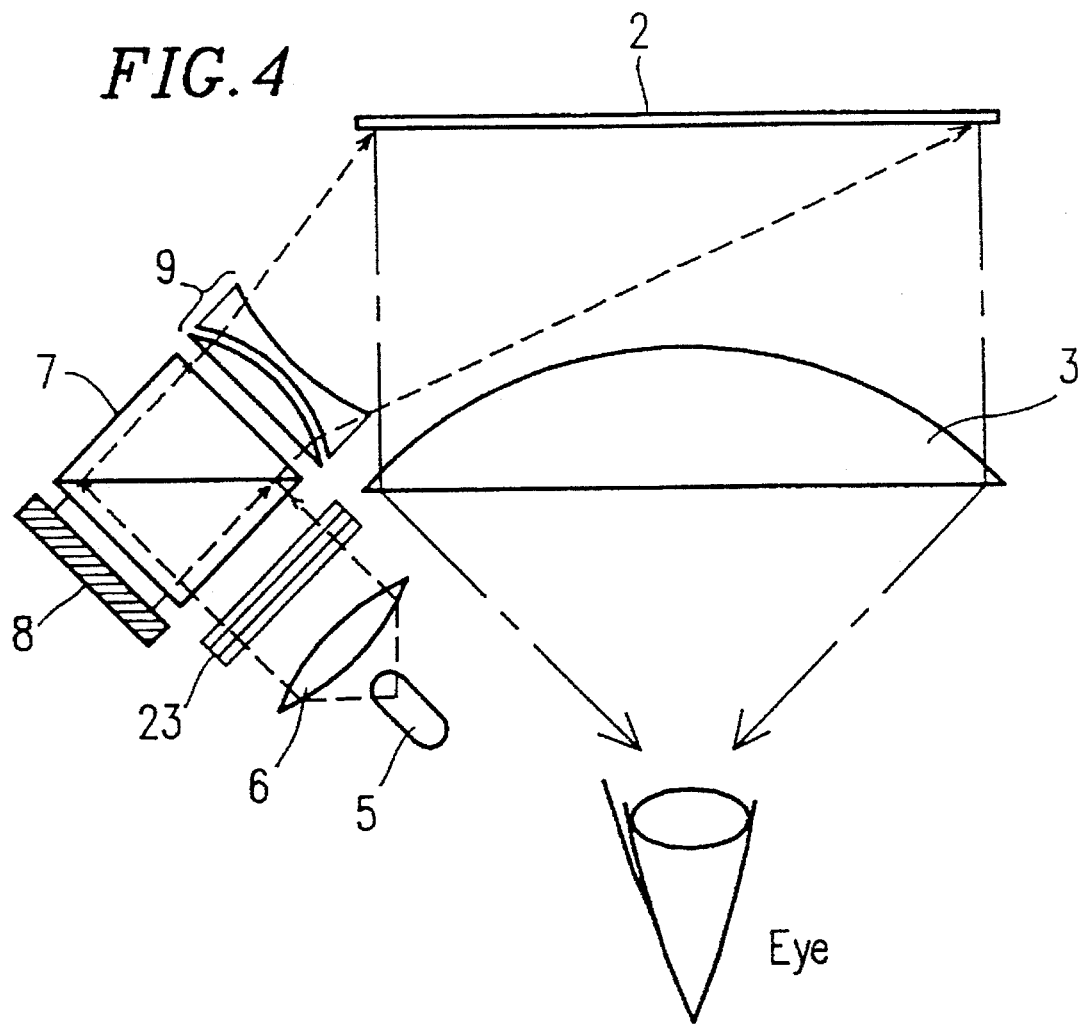
FIG. 4 schematically shows the principle of display for a second example according to an embodiment of the present invention.

Referring to FIG. 4, a second example of the present invention will be described. The components having the same functions as those in Example 1 are denoted by the same reference numerals.

The feature of this example is that a color sequential switching method is used to realize color display. The goggle type display apparatus of this example additionally includes light selection means disposed between the collimating optical system 6 and the polarization beam splitter 7. The light selection means gives a color sequentially to an image to be displayed. The other components are the same as those of the goggle type display apparatus of Example 1, and thus the description thereof is omitted here.

In this example, a color sequential filter 23 is used as the light selection means, which allows red color light, green color light, and blue color light to selectively pass therethrough. The color sequential filter 23 which is disposed between the collimating optical system 6 and the polarization beam splitter 7 converts the light emitted from the lamp 5 to red, green, and blue colors sequentially. As a result, full color display with high precision can be obtained, and thus images with significantly high realism can be realized.

Figure 5:
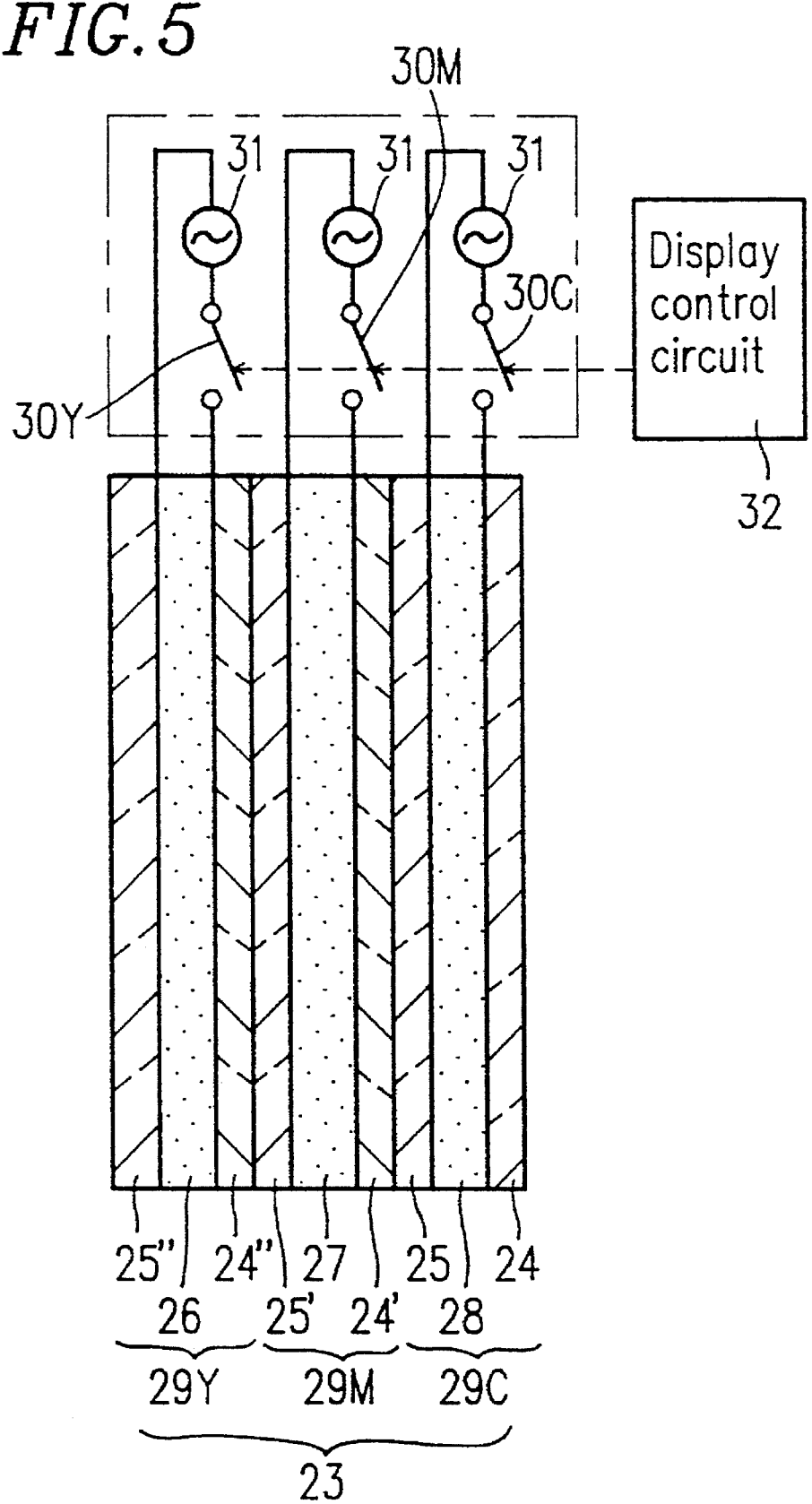
FIG. 5 shows a configuration of a color sequential filter as a light selection means of the second example.

FIG. 5 shows a configuration of the color sequential filter 23.

The color sequential filter 23 includes a cyan filter 29C, a magenta filter 29M, and a yellow filter 29Y layered in this order. The cyan filter 29C has a liquid crystal layer 28 containing a cyan dichroic pigment, and a pair of transparent substrates 24 and 25 facing each other so as to sandwich the liquid crystal layer 28 therebetween. The surfaces of the transparent substrates 24 and 25 facing the liquid crystal layer 28 are entirely covered with transparent electrodes not shown. The magenta filter 29M has a liquid crystal layer 27 containing a magenta dichroic pigment, and a pair of transparent substrates 24' and 25' facing each other so as to sandwich the liquid crystal layer 27 therebetween. The surfaces of the transparent substrates 24' and 25' facing the liquid crystal layer 27 are entirely covered with transparent electrodes (not shown). The yellow filter 29Y has a liquid crystal layer 26 containing a yellow dichroic pigment, and a pair of transparent substrates 24" and 25" facing each other so as to sandwich the liquid crystal layer 26 therebetween. The surfaces of the transparent substrates 24" and 25" facing the liquid crystal layer 26 are entirely covered with transparent electrodes not shown.

An AC voltage is applied to the cyan filter 29C, the magenta filter 29M, and the yellow filter 29Y through switching circuits 30C, 30M, and 30Y, respectively. The switching circuits 30C, 30M, and 30Y allow the AC voltage to be selectively applied to the cyan filter 29C, the magenta filter 29M, and the yellow filter 29Y, respectively, based on a switching signal supplied from a display control circuit 32, so as to drive the respective filters. By this control of the switching of the filters, red color light, green color light, and blue color light are sequentially allowed to transmit through the color sequential filter 23 to enter the polarization beam splitter 7.

Table 2 below shows the relationship between the ON/OFF status of the filters 29C, 29M, and 29Y and the color of light incident to the polarization beam splitter 7.

TABLE 2

| Driving status | | | Color of incident |
|---|---|---|---|
| 29C | 29M | 29Y | light |
| ON | OFF | OFF | Red |
| OFF | ON | OFF | Green |
| OFF | OFF | ON | Blue |

Figure 6:
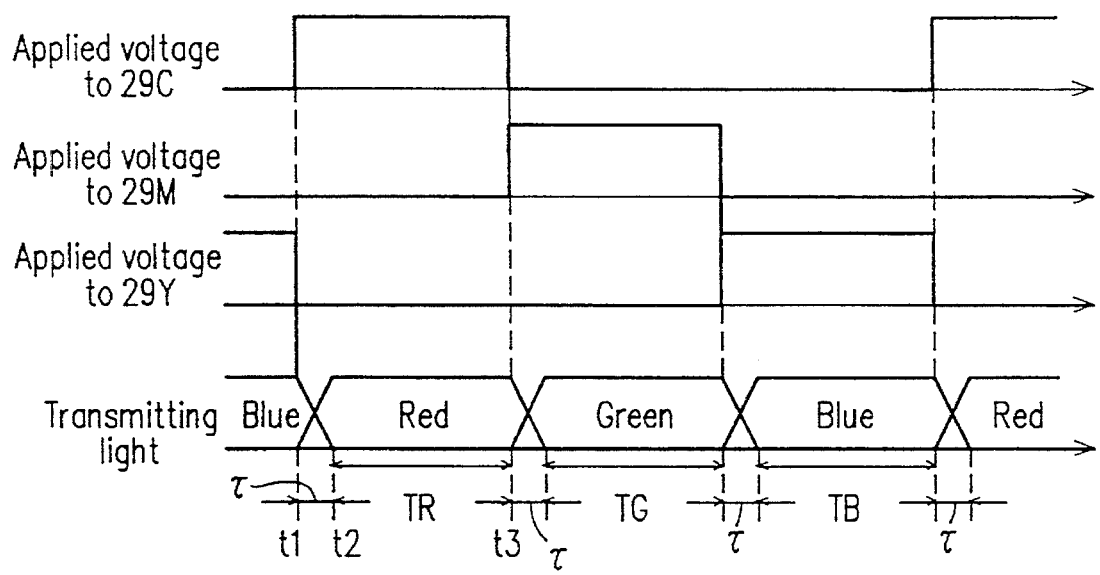
FIG. 6 is a timing chart showing the operation of the color sequential filter of FIG. 5.

FIG. 6 is a timing chart of a principal operation of the color sequential filter 23. A voltage is applied to the cyan filter 29C during the period from time t1 to time t3. The orientation of the liquid crystal molecules does not change immediately, but a predetermined transition period $\tau$ is required. The transition period $\tau$ corresponds to the speed at which the liquid crystal molecules are recovered in response to the electric field. Accordingly, when a voltage is applied to the liquid crystal molecules at time t1, it is at time t2 after the lapse of the transition period $\tau$ from time t1 when the cyan filter 29C actually responds to the voltage and the orientation of the liquid crystal molecules is stabilized. Thus, for a period TR from time t2 to time t3, red color light transmits through the color sequential filter 23.

After the above operation, a voltage is sequentially applied to the magenta filter 29M, the yellow filter 29Y, the cyan filter 29C, and so on repeatedly in this order, changing the color of light transmitting through the color sequential filter 23 to green color light, blue color light, red color light, and so on.

In the above operation, a problem relating to the response characteristics of the liquid crystal layers may arise. The lower limit of the frequency range in which flickering will not be recognized by human eyes is approximately 30 Hz. Accordingly, in the above example, a period allocated for the display corresponding to each of the red, green, and blue colors is set to approximately 10 msec. In order to realize satisfactory color display within 10 msec, the color sequential filter 23 and the LCD should conduct color modulation and display for each color within the response time of several msec or less.

According to this example, since single crystal silicon is used for the substrate of the LCD, high speed driving is possible. Further, in this example, a line memory is provided for each data line of the LCD so as to transfer data corresponding to one scanning line at one time, and the driving frequency is set to 10 MHz. Accordingly, the time required to transfer data to 1000 scanning lines corresponding to one screen is 0.1 msec, which fully satisfies the above requirement. The liquid crystal used in this example is of type where high speed response display is possible, and the response time is as short as 0.1 msec. The high speed response type liquid crystal is also used for the color sequential filter 23. The response time is therefore sufficiently short enough to satisfy the above requirement.

According to this example, the R (red), G (green), and B (blue) three colors are displayed on each pixel of the LCD, and are not required to be allocated to the pixels. As a result, images with high precision can be obtained.

The color sequential filter 23 is not limited to the configuration shown in this example, but may also be composed of three kinds of liquid crystal containing red, green, and blue color pigments. Other filters such as a filter composed of a color polarizing plate and a liquid crystal panel laminated to each other and a filter composed of a neutral polarizing plate and a liquid crystal panel laminated to each other, can also be used as long as they can switch desired colors at high speed.

In this example, the color sequential filter 23 is disposed between the collimating optical system 6 and the polarization beam splitter 7. However, the color sequential filter 23 can also be disposed at any position, for example, between the lamp 5 and the collimating optical system 6, between the polarization beam splitter 7 and the projection optical system 9, between the LCD 8 and the polarization beam splitter 7, and between the projection optical system 9 and the screen 2, as long as the color sequential filter 23 can provide satisfactory performance as the light selection means.

(EXAMPLE 3)

Figure 7:
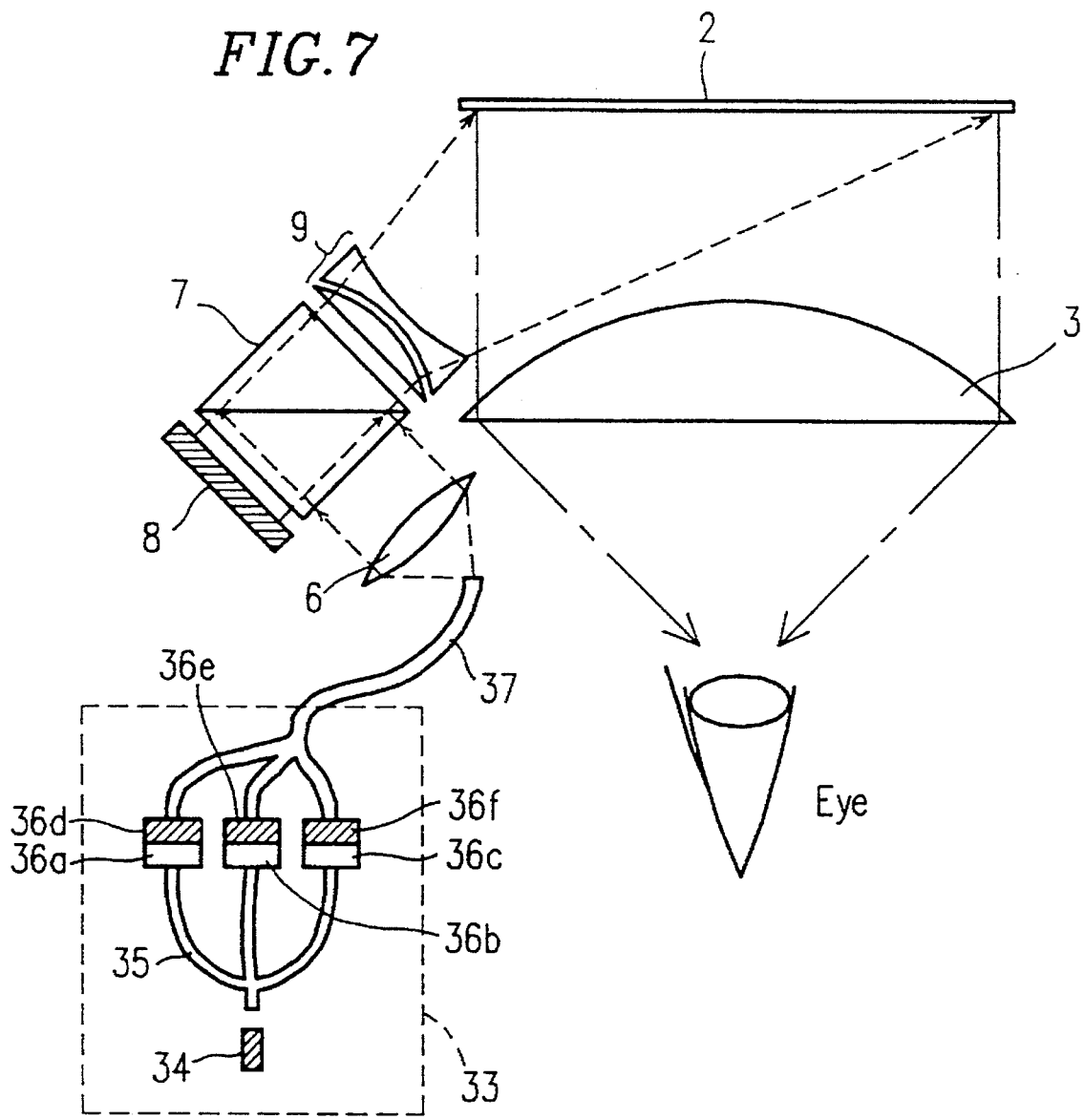
FIG. 7 schematically shows the principle of display for a third example according to an embodiment of the present invention.

Referring to FIG. 7, a third example according to the present invention will be described.

The goggle type display apparatus of this example includes a color light formation unit 33 used as the light selection device. The color light formation unit 33 separates red, green, and blue colors from a white color light source, and sequentially switches these colors to output as source light. The color light formation unit 33 of this example is disposed separately from the head mounted portion of the goggle display apparatus, and supplies color light to the display unit in the head mounted portion through an optical fiber. The components other than the color light formation unit 33 are the same as those of Example 1, and thus the description thereof is omitted here.

Figure 8:
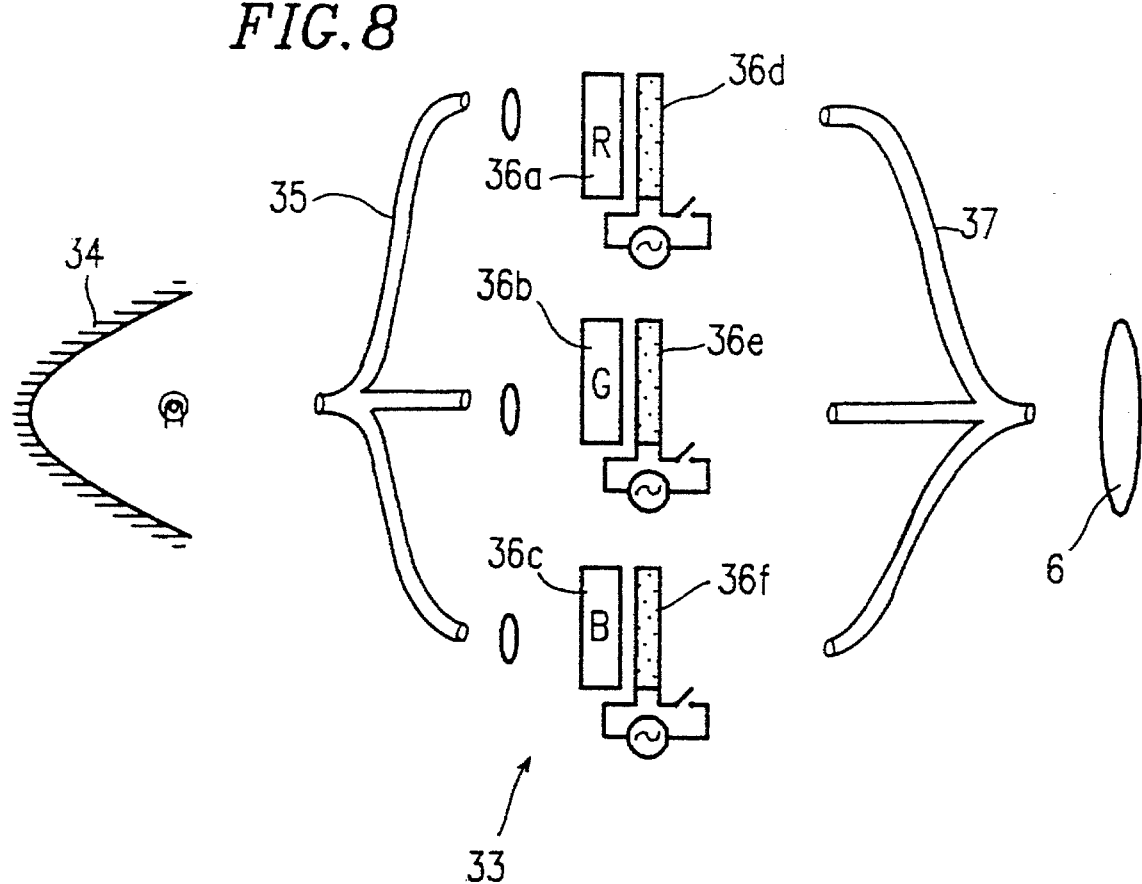
FIG. 8 shows a configuration of a color light formation unit as light selection means of the third example.

FIG. 8 shows the configuration of the color light formation unit 33 in more detail. The color light formation unit 33 includes a white color light source 34, optical fibers 35 and 37, and an optical shutter composed of color filters 36a, 36b, and 36c, and optical switching elements 36d, 36e, and 36f. Light emitted from the white color light source 34 is separated into three routes through the optical fiber 35 disposed at the output side of the white color light source 34. At the respective output ends of the optical fiber 35 are disposed the red color filter 36a with the optical switching element 36d, the green color filter 36b with the optical switching element 36e, and the blue color filter 36c with the optical switching element 36f. The other optical fiber 37 for guiding the light which has been filtered by the color filters 36a, 36b, and 36c to the display unit is disposed downstream of the optical switching elements 36d, 36e, and 36f.

Color filters using dyes and pigments or interference filters formed of the lamination of inorganic or organic optical thin films are used for the color filters 36a, 36b, and 36c. Liquid crystal or ceramics such as PLZT is used for the optical switching elements 36d, 36e, and 36f. For the liquid crystal, that of a typical display type such as scattering type, rotating type, birefringence type, and light absorption type are applicable. Especially, when high speed response is required, liquid crystal of polymer dispersion type, phase transition type, ferroelectric type, and antiferroelectric type is preferable.

Figure 9:
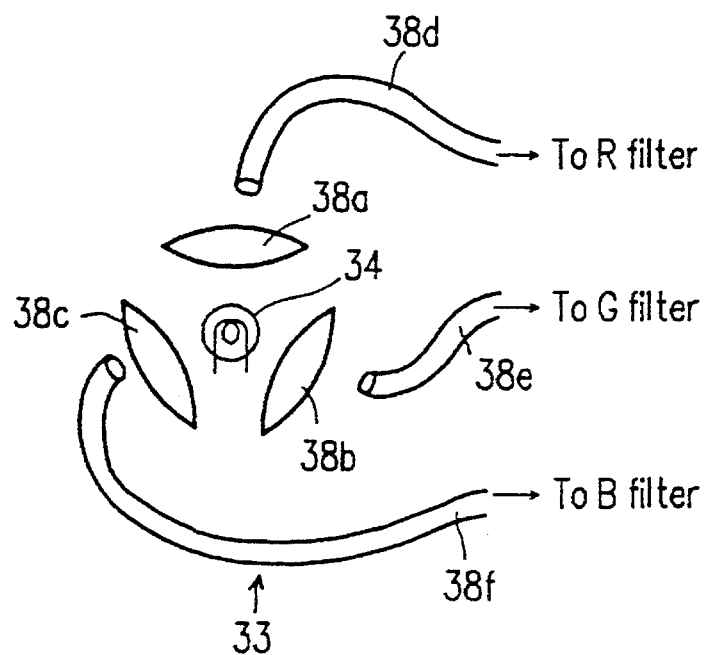
FIG. 9 shows a configuration of another color light formation unit of FIG. 8.

The separation of light by the light selection means of this example may be conducted by different methods. For example, as shown in FIG. 9, the light separation can be conducted by using three sets of lenses 38a, 38b, and 38c and optical fibers 38d, 38e, and 38f, so as to obtain three components of light from the single white color light source 34. The separation of light can also be conducted by other methods, including a method of guiding light separately from three light sources through respective optical fibers and a method of combining a single light source and a beam splitter (or a dichroic mirror), though these methods are not shown. A mechanical rotation filter and the like can also be used as the light selection means as far as desired colors can be switched at high speed.

Figure 10:
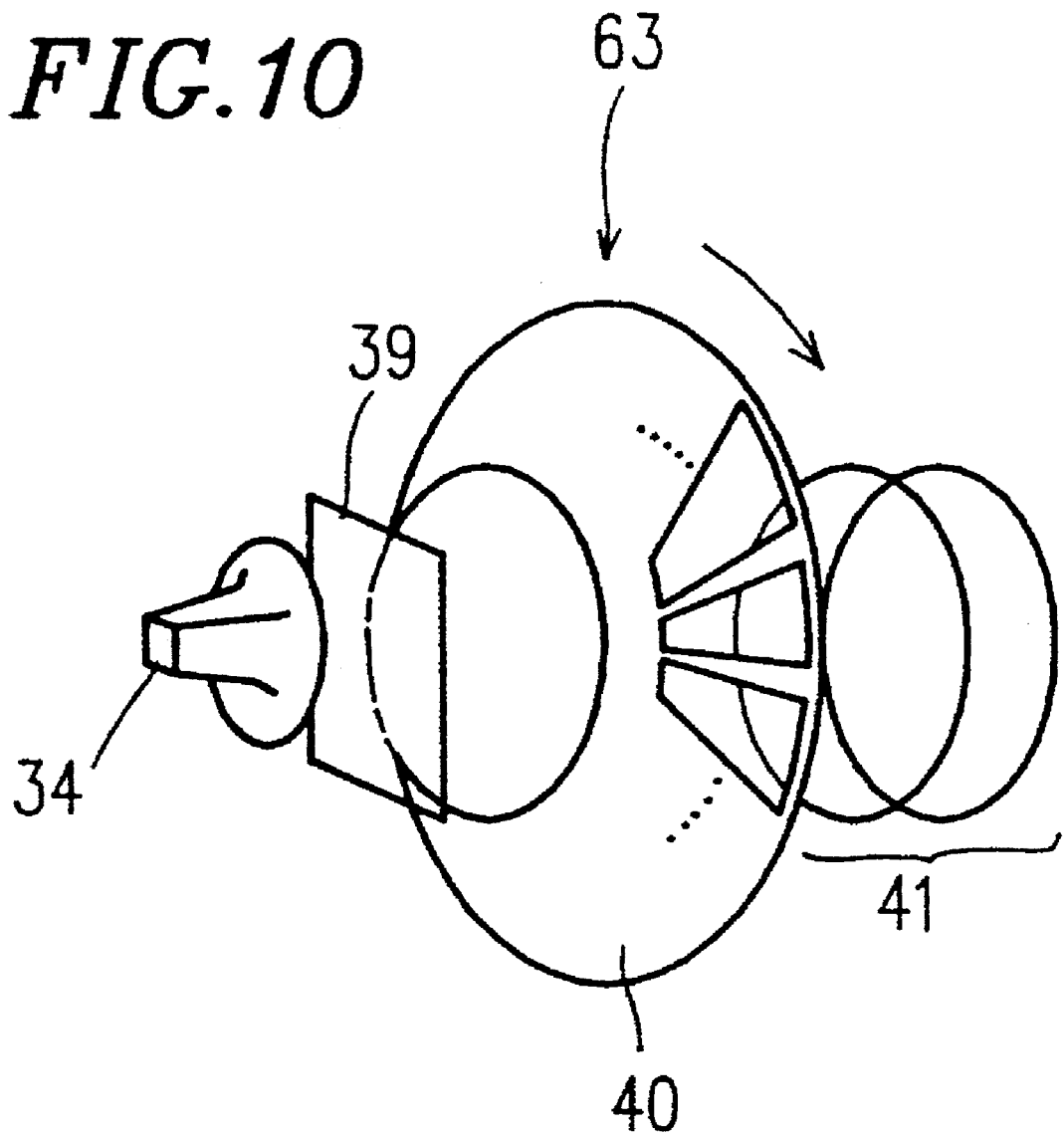
FIG. 10 shows a mechanical rotation filter as light selection means according to an embodiment of the present invention.

FIG. 10 shows a mechanical rotation filter unit 63 as the light selection means. The filter unit 63 includes the white color light source 34, an ultraviolet ray cutting filter 39, a mechanical RGB rotation filter 40, and a lens 41. Light emitted from the white color light source 34 passes through the ultraviolet ray cutting filter 39 to remove ultraviolet rays from the emitted light. Then, the light is incident to the mechanical RGB rotation filter 40 to be given one of the three colors of R, G, and B. The color light is then output through the lens 41.

According to this example, as in Example 2, the R, G, and B three colors are displayed on each pixel of the LCD, and not required to be allocated to the pixels. As a result, images with high precision can be obtained.

Further, according to this example, the light selection means is disposed separately from the head mounted portion of the goggle display apparatus, and supplies light to the head mounted portion through the optical fiber. Accordingly, the size and weight of the head mounted portion can be reduced. Further, the end of the optical fiber may be pointed so as to obtain a point light source, so that the efficiency of light utilization can be enhanced.

When the light selection means is a small unit, it may be disposed in the head mounted portion of the goggle type display apparatus. Also, one light selection means may be shared for the left and right eyes by splitting light from the light selection means into two for the left and right LCDs. Alternatively, color filters may be disposed on each of the pixels of the LCD to allocate R, G, and B colors to the respective pixels.

Figure 11:
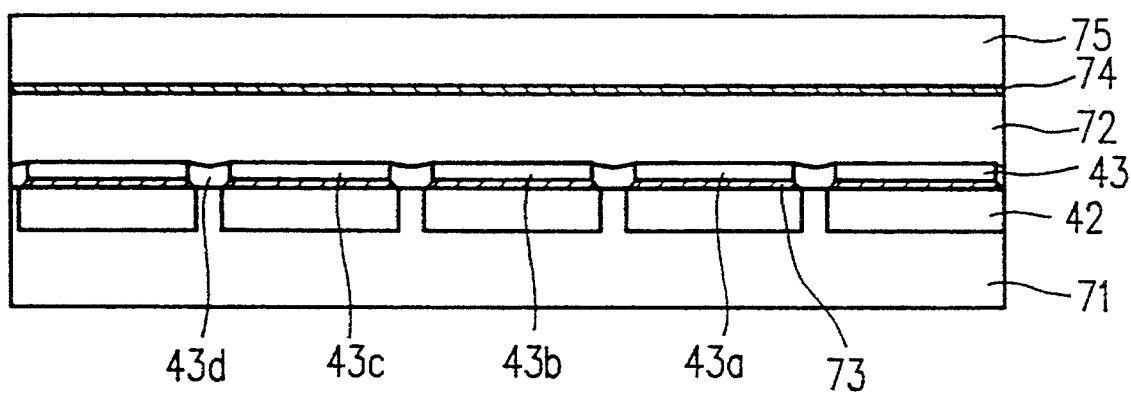
FIG. 11 is a sectional view of an LCD used for light selection means according to an embodiment of the present invention.

FIG. 11 shows an example of such an LCD having R, G, and B color filters incorporated therein. This LCD is a reflection type color LCD, each pixel of which is divided into three, and each of such three divisions has either one of red, green, and blue color filters. The LCD includes a substrate 71 made of single crystal silicon and switching circuit regions 42 for switching a liquid crystal layer 72 disposed thereon. The three switching circuit regions 42 corresponds to one pixel. Reflection films 73 are formed on the respective switching circuit regions 42, and a gelatin film 43 is formed over the top surface of the substrate 71 covering the reflection films 73. The reflection films 73 function as lower electrodes of the LCD. Three portions of the gelatin film 43 located above the three switching circuit regions 42 corresponding to one pixel are dyed in red, green, and blue, forming a red color filter 43a, a green color filter 43b, and a blue color filter 43c, respectively. The other portions of the gelatin film 40 located above the gaps between the switching circuit regions 42 are not dyed, forming non-dyed regions 43d. A transparent electrode 74 is formed on the liquid crystal layer 72, and a transparent glass substrate 75 is formed on the transparent electrode 74.

Since the gelatin and the technique of dying the gelatin have already been developed for the application to CCDs (charge coupled devices), the conventional equipment and technique can be utilized. Materials other than gelatin may also be used for the color filters. Alternatively, instead of forming the gelatin film on the silicon substrate, a film and the like forming a color filter may be adhered to the transparent glass substrate 75.

Stereoscopic images were reproduced by use of the above goggle type display apparatuses for VR according to the present invention. As a result, images with superior realism were obtained for any of the display apparatuses. Though only the display apparatus was described in the above examples, it will be easily understood that a voice generating apparatus and a telecommunication apparatus for transmitting display data to the display apparatus may be connected to the display apparatus.

(EXAMPLE 4)

Figure 12:
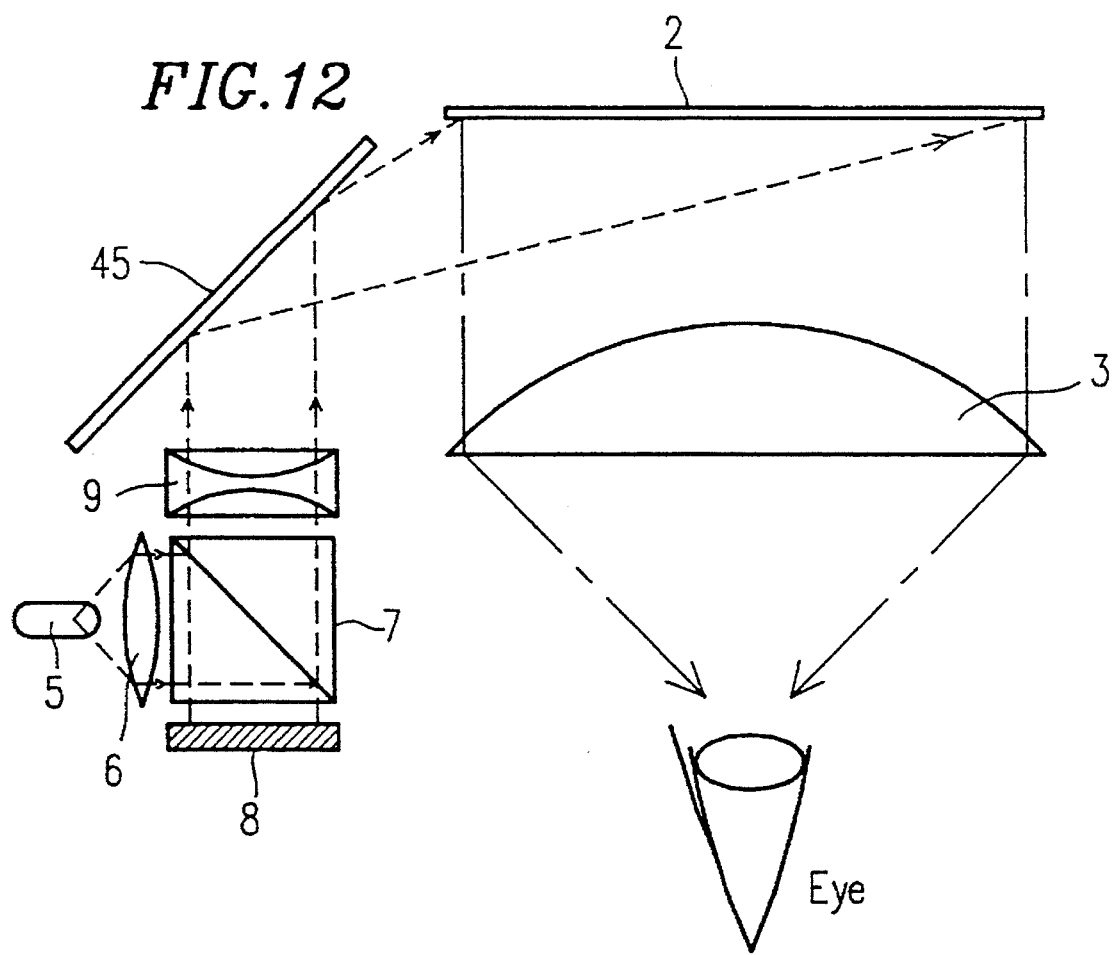
FIG. 12 schematically shows the principle of display for a fourth example according to an embodiment of the present invention.

In Examples 1 to 3, images displayed on the LCD are projected onto the screen through the optical system. A reflection mirror may be additionally disposed between the LCD and the screen. FIG. 12 shows a fourth example of the goggle type display apparatus using a reflection mirror according to the invention. The components having the same functions as those in Examples 1 to 3 are denoted by the same reference numerals.

Light emitted from the lamp 5 is made parallel by the collimating optical system 6. The parallel light is then split into an s polarizing wave and a p polarizing wave by the polarization beam splitter 7. The light is then modulated by the reflection type LCD 8 according to an image signal, and returns to the polarization beam splitter 7. Thereafter, the light is incident to a mirror 45 as the reflection means through the projection optical system 9 and then reflected therefrom so as to be projected onto the screen 2. Light selection means such as a color sequential filter may be disposed appropriately, for example, between the collimating optical system 6 and the polarization beam splitter 7.

The goggle type display apparatus of this example is advantageous in that, as is apparent from FIG. 12, the projection optical system can be disposed in parallel or vertically to the screen 2. As a result, the optical system can be more freely positioned, so as to reduce the size of the display apparatus.

(EXAMPLE 5)

Figure 13:
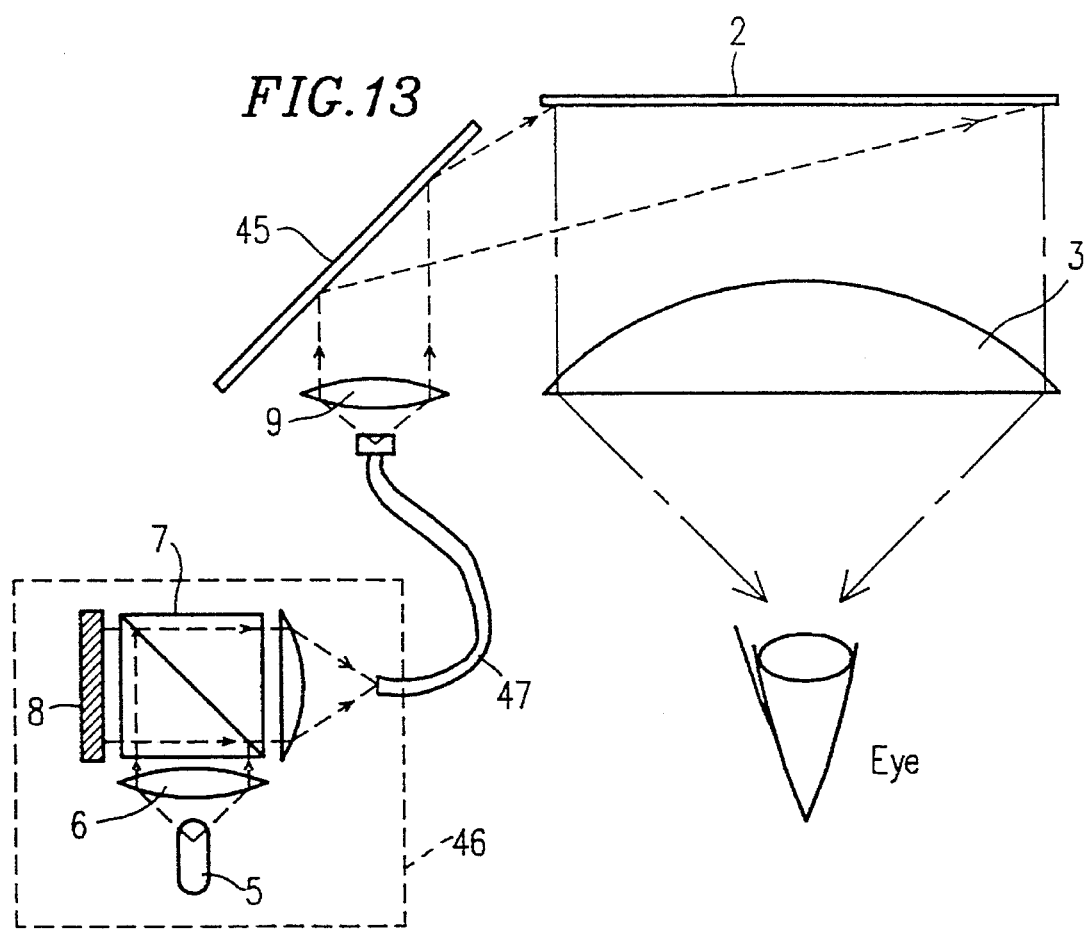
FIG. 13 schematically shows the principle of display for a fifth example according to an embodiment of the present invention.

FIG. 13 shows a fifth example of the present invention. The components having the same functions as those in Examples 1 to 4 are denoted by the same reference numerals.

The feature of the goggle type display apparatus of this example is that the lamp 5, the collimating optical system 6, the polarization beam splitter 7, the LCD 8 and the like are formed as an image generation unit 46 disposed separately from the head mounted portion of the goggle type display apparatus. The image generation unit 46 and the head mounted portion are connected through an optical fiber 47. The other configuration is the same as that of Example 4. The optical fiber 47 guides light carrying image information provided by the LCD 8 to the mirror 45.

According to this example, since relatively heavy portions such as the LCD and the optical system can be separated from the head mounted portion of the goggle type display apparatus, the size of the head mounted portion can be further reduced.

(EXAMPLE 6)

Figure 14:
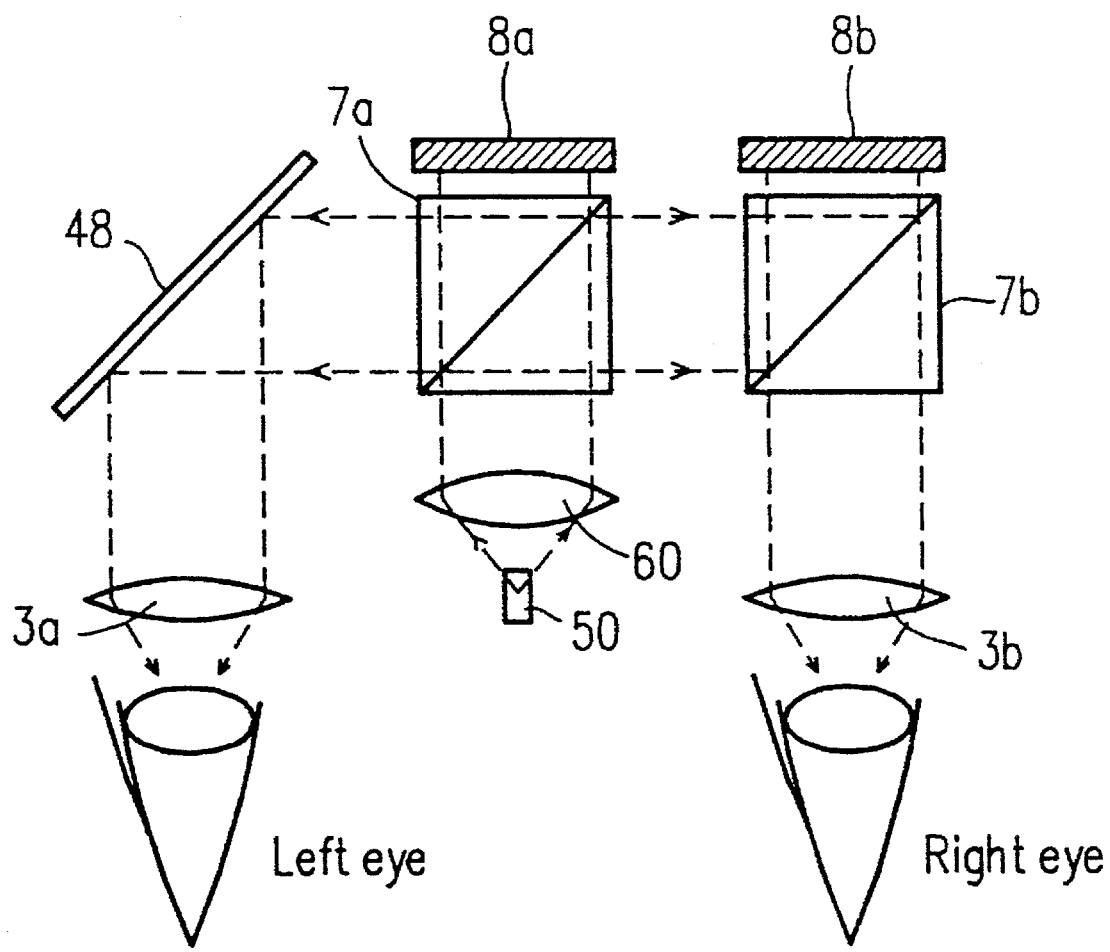
FIG. 14 schematically shows the principle of display for a sixth example according to an embodiment of the present invention.
Figure 15:
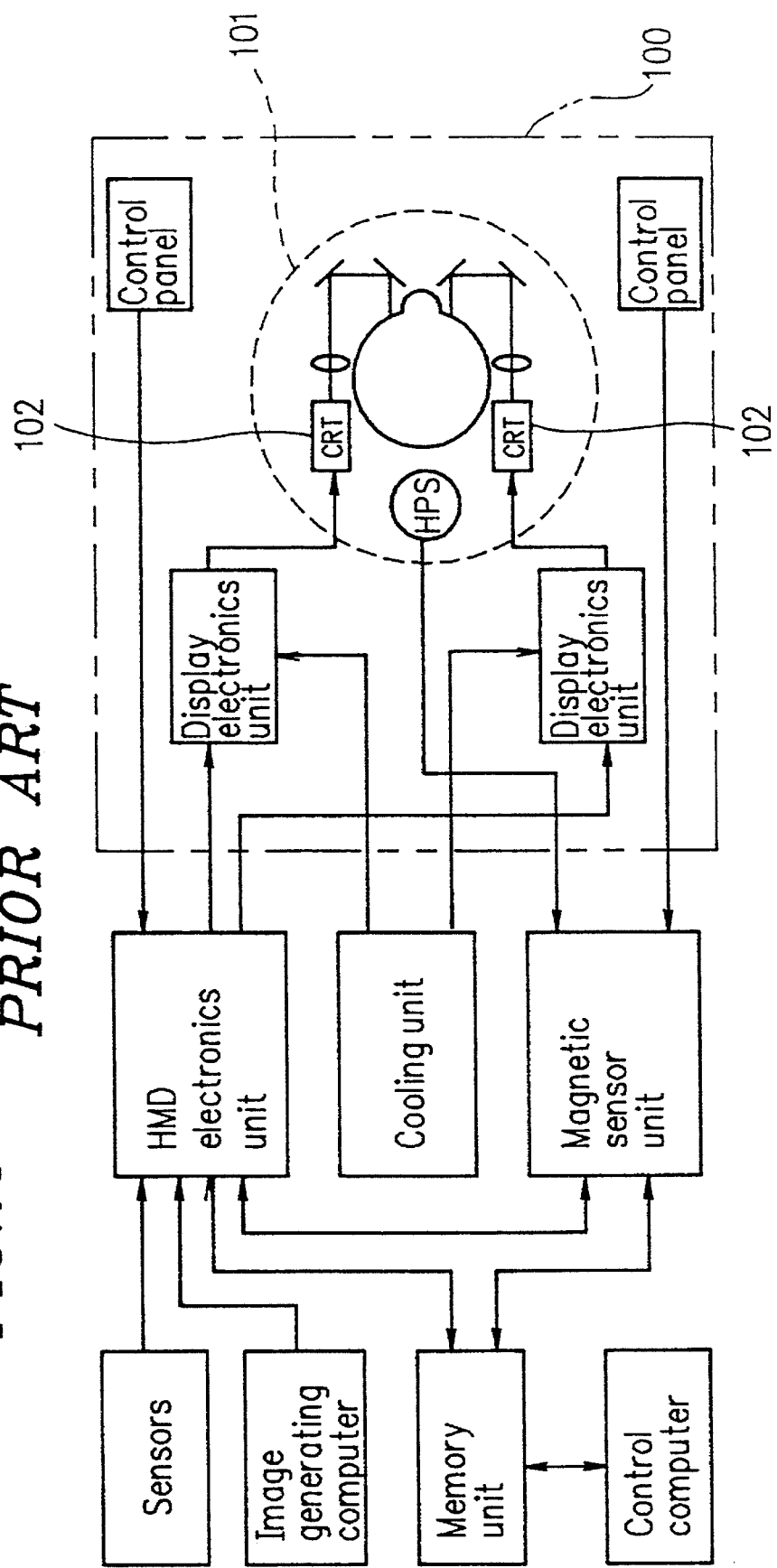
FIG. 15 shows the concept of a VPD system using a conventional goggle type display apparatus.
Figure 16:
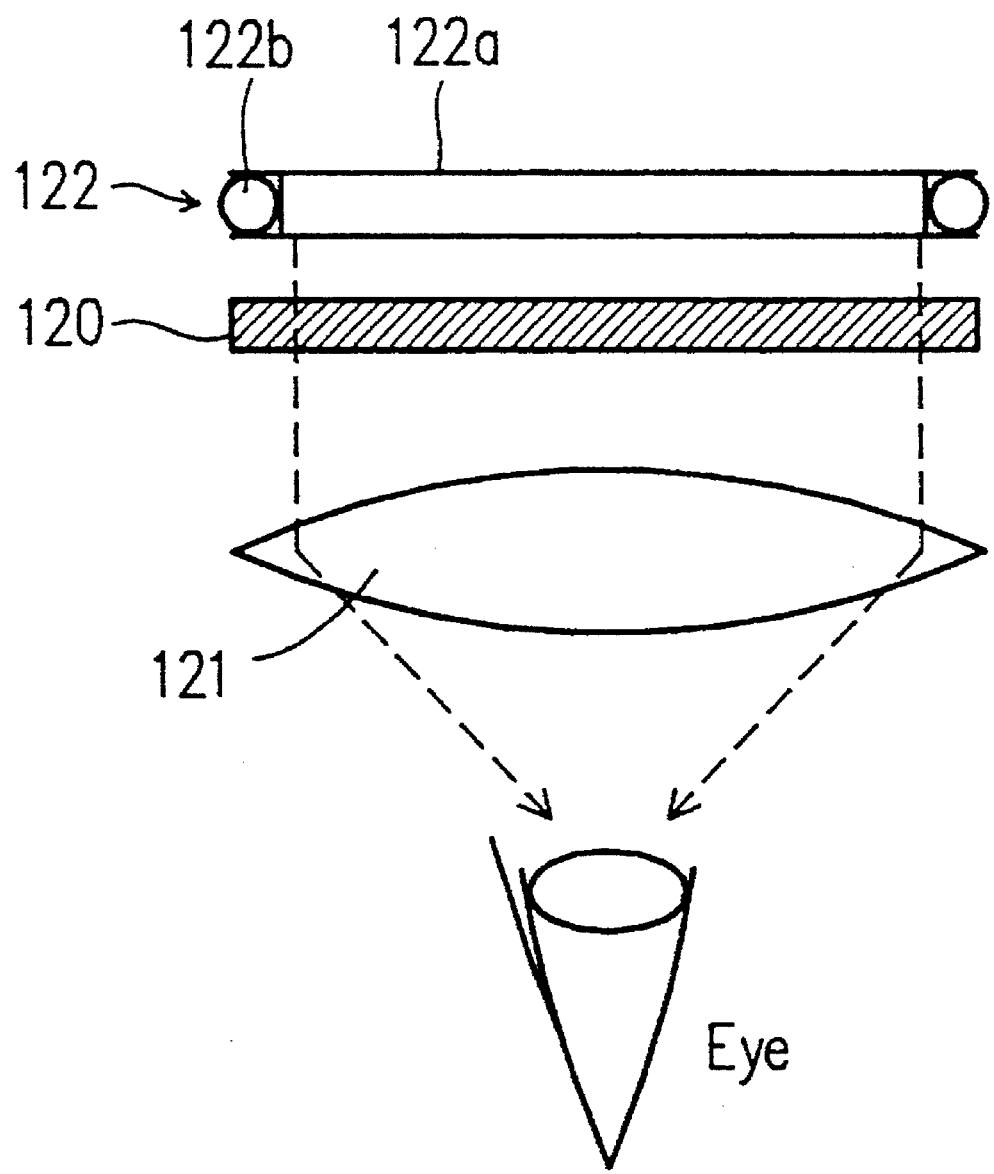
FIG. 16 schematically shows the principle of display for a conventional goggle type display apparatus.
Figure 17:
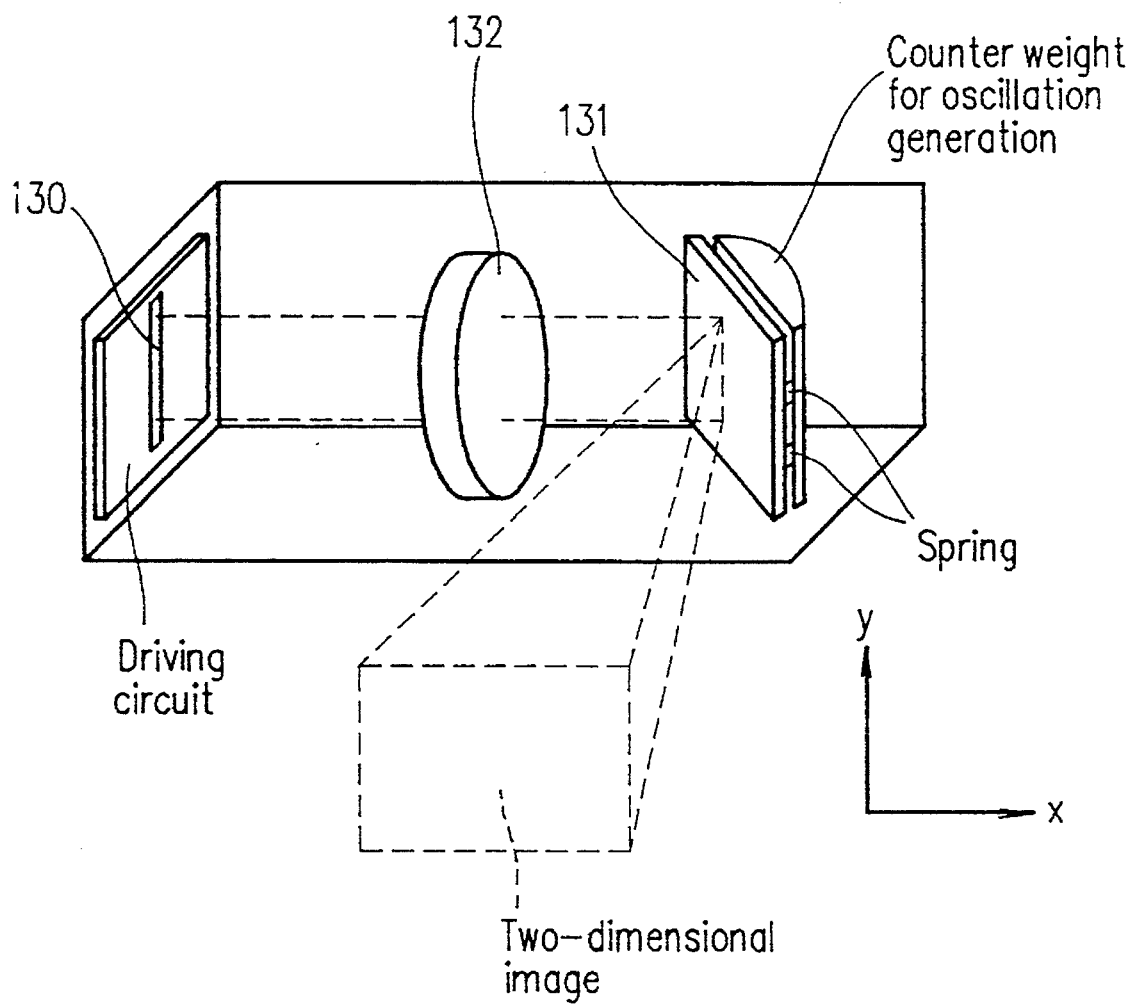
FIG. 17 schematically shows the principle of display for another conventional goggle type display apparatus.

FIG. 14 shows a sixth example of the present invention.

The goggle type display apparatus of this example is smaller and lighter than those in previous examples. According to this example, light emitted from a single light source 50 is converted to parallel light by a collimating optical system 60 and then incident to a polarization beam splitter 7a. The incident light is split into light under a first polarized condition and light under a second polarized condition. The light under the first polarized condition passes straight through the polarization beam splitter 7a to be incident to an LCD 8a. Part of the light incident to the LCD 8a is modulated according to image data written on the LCD 8a and also modulated into the second polarized condition. The light under the second polarized condition output from the LCD 8a is first reflected by the polarization beam splitter 7a, then reflected by a reflection mirror 48, and projected onto the left eye through an eyepiece optical system 3a. The light under the first polarized condition which had not been modulated by the LCD 8a passes through the polarization beam splitter 7a back to the light source 50. This light is reflected by a reflection mirror (not shown) disposed in the light source 50 for reuse.

The light emitted from the light source 50 and polarized into the second polarized condition by the polarization beam splitter 7a is reflected by the polarization beam splitter 7a to be incident to a polarization beam splitter 7b. The light is again reflected by the polarization beam splitter 7b to be incident to an LCD 8b. Part of the incident light is modulated by the LCD 8b into the first polarized condition according to image information written on the LCD 8b, passes through the polarization beam splitter 7b, and then projected onto the right eye through an eyepiece optical system 3b. The light under the first polarized condition which had not been modulated by the LCD 8b is first reflected by the polarization beam splitter 7b, then reflected by the polarization beam splitter 7a, and returns to the light source 50. This light is reflected by the reflection mirror (not shown) disposed in the light source 50 for reuse.

As described above, the goggle type display apparatus of this example requires only one light source and reuses light emitted from the light source. Accordingly, bright display is possible by using a light source with lower output. As a result, the size of the light source itself can be reduced, realizing a small and light goggle type display apparatus.

In this example, images are directly projected onto the eyes by use of the eyepiece optical systems. Alternatively, light may be projected on a screen through the polarization beam splitter so that the projected images can be viewed by the user. Color filters which can be sequentially switched may be disposed somewhere in the light path for color display for the left and right eyes. A light source itself may have means for color sequential switching. In this case, more realistic color images can be obtained. Alternatively, color filters may be incorporated in an LCD as shown in FIG. 11. Further, as described in Example 5, a comparatively large portion of the goggle type display apparatus of this example may be disposed separately from the head mounted portion thereof.

Thus, according to the present invention, the reflection type LCD where a reflection film can be formed above the transistors is used as visual information formation means. Accordingly, the display apparatus can be made small and light. Also, even when the driving circuits of the LCD occupy a large portion of the pixels, the pixels can be miniaturized without lowering the efficiency of light utilization. As a result, a small and light display apparatus for VR with high precision and superior realism which provides natural images can be realized.

According to the goggle type display apparatus of the present invention, images displayed on the LCD are magnified and projected on the screen. Therefore, the broad field of vision and superior display characteristics can be obtained.

Further, single crystal silicon is used for the substrate on which the transistors of the LCD are formed. Therefore, the size of the LCD can be made smaller and the pixels of the LCD can be miniaturized. Thus, even when a screen and the like are used, the size of the apparatus is prevented from increasing, and the image quality is prevented from lowering.

Moreover, the color display is conducted by the color sequential method where each pixel displays R, G, and B colors sequentially. Accordingly, color display with high precision can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A goggle type display apparatus having first image formation means for providing an image for the left eye and second image formation means for providing an image for the right eye, each of the first image formation means and the second image formation means comprising:

light polarization means for polarizing light emitted from a light source;

reflection type display means including a substrate, switching means formed on the substrate, a display medium for modulating the light polarized by the light polarization means to provide the light with image information, and an electrode layer electrically connected to the switching means for applying a voltage to the display medium, the electrode layer reflecting the light incident thereto after passing through the display medium; and a screen on which the light carrying the image information supplied from the reflection type display means is projected.

2. A goggle type display apparatus according to claim 1, wherein the display medium of the reflection type display means is liquid crystal.

3. A goggle type display apparatus according to claim 1, wherein the substrate of the reflection type display means is made of single crystal silicon.

4. A goggle type display apparatus according to claim 1, wherein each of the first image formation means and the second image formation means further comprises light converging means for converging the light projected onto the screen.

5. A goggle type display apparatus according to claim 1, wherein each of the first image formation means and the second image formation means further comprises light collimating means for collimating the light emitted from the light source.

6. A goggle type display apparatus according to claim 1, wherein each of the first image formation means and the second image formation means further comprises light selection means selectively converting the light emitted from the light source to red color light, green color light, and blue color light.

7. A goggle type display apparatus according to claim 6, wherein the light selection means includes a liquid crystal layer containing a cyan dichroic pigment, a liquid crystal layer containing a magenta dichroic pigment, and a liquid crystal layer containing a yellow dichroic pigment.

8. A goggle type display apparatus according to claim 6, wherein the light selection means includes a first filter allowing red color light to pass therethrough, a second filter allowing green color light to pass therethrough, a third filter allowing blue color light to pass therethrough, a first optical fiber for guiding the light emitted from the light source to the first, second, and third filters, and a second optical fiber for guiding the light after having passed the first, second, and third filters to the light polarization means.

9. A goggle type display apparatus according to claim 6, wherein the light selection means includes a mechanical RGB rotation filter.

10. A goggle type display apparatus according to claim 1, wherein each of the first image formation means and the second image formation means further comprises reflection means for reflecting the light carrying the image information supplied from the reflection type display means to the screen.

11. A goggle type display apparatus according to claim 10, wherein each of the first image formation means and the second image formation means further comprises an optical fiber for guiding the light carrying the image information supplied from the reflection type display means to the reflection means.

12. A goggle type display apparatus according to claim 1, wherein at least one of the light polarization means of the first and the second image formation means is a polarization beam splitter.

13. A goggle type display apparatus having first image formation means for providing an image for the left eye and second image formation means for providing an image for the right eye, each of the first image formation means and the second image formation means comprising:

light polarization means for polarizing light emitted from a light source;

reflection type display means including a substrate, switching means formed on the substrate, a display medium for modulating the light polarized by the light polarization means to provide the light with image information, and an electrode layer electrically connected to the switching means for applying a voltage to the display medium the electrode layer reflecting the light incident thereto after passing through the display medium; and projection means for magnifying and projecting the light reflected from the electrode layer of the reflection type display means.

14. A goggle type display apparatus having first image formation means for providing an image for the left eye and second image formation means for providing an image for the right eye, each of the first image formation means and the second image formation means comprising:

light polarization means for polarizing light emitted from a light source;

reflection type display means including a substrate, switching means formed on the substrate, a display medium for modulating the light polarized by the light polarization means to provide the light with image information, and an electrode layer electrically connected to the switching means for applying a voltage to the display medium, the electrode layer reflecting the light incident thereto after passing through the display medium; and wherein at least one of the first image formation means and the second image formation means includes means for bending a direction in which the light carrying the image information supplied from the reflection type display means travels.

15. A goggle type display apparatus according to claim 14, one of the first image formation means and the second image information means includes the means for bending the direction of the light from the reflection type display, and the other serves as a direct-view type display.

16. A goggle type display apparatus according to claim 14, wherein the light source is a single light source used commonly to the first image formation means and the second image formation means, and the light polarization means of one of the first image formation means and the second image formation means splits the light from the single light source into two light beams, and one of the two light beams is supplied to the first image information means, while the other is supplied to the second information means.

17. A goggle type display apparatus according to claim 14, wherein each of the first image formation means and the second image formation means includes an optical system for projecting the image directly onto the respective eye.

18. A goggle type display apparatus according to claim 14, wherein the substrate of the reflection type display means is made of single crystal silicon.

* * * * *